United States Patent [19]

Yokomizo

[11] Patent Number: 5,682,494
[45] Date of Patent: Oct. 28, 1997

[54] MEMORY MANAGEMENT SYSTEM AND METHOD

[75] Inventor: Takashi Yokomizo, Tokyo, Japan

[73] Assignee: NEC Corporation, Tokyo, Japan

[21] Appl. No.: 268,512

[22] Filed: Jun. 30, 1994

[30] Foreign Application Priority Data

Jul. 5, 1993 [JP] Japan .................... 5-190964

[51] Int. Cl.$^6$ .................... G06F 12/00
[52] U.S. Cl. .................... 395/405; 395/608
[58] Field of Search .................... 395/405, 650, 395/608, 726, 480

[56] References Cited

U.S. PATENT DOCUMENTS

| | | | |
|---|---|---|---|
| 5,261,106 | 11/1993 | Lentz et al. | 395/725 |
| 5,359,568 | 10/1994 | Livay et al. | 365/221 |
| 5,485,593 | 1/1996 | Baker | 395/200.08 |

OTHER PUBLICATIONS

Abstract of Japanese Pub. No. JP63109553, May 14, 1988, Uejima Kentaro, Memory Management System.
EDN Electrical Design News, vol. 36, No. 3, Feb. 4, 1991, pp. 85–90.
IBM Technical Disclosure Bulletin, vol. 33, No. 8, Jan. 1991, pp. 474–479.
IBM Technical Disclosure Bulletin, vol. 34, No. 12, May 1992, pp. 37–38.

Primary Examiner—Jack A. Lane
Attorney, Agent, or Firm—Foley & Lardner

[57] ABSTRACT

A memory management system for managing a memory block in an operating system, which adopts variable length memory block management, and in which a memory area of a memory block management table that is appended when acquiring the memory block is used as an object management table. The memory block management system includes at least, a memory block address calculator for calculating a low-order and a high-order addresses of the memory block, a memory pool address preservation portion preserves a memory pool address stored in the memory block management table in a memory pool address storage area when acquiring the memory block for the object management table from a memory pool, a memory pool address return portion reading out a memory pool address held in the memory pool address preservation portion when returning the memory block or the object management table to the memory pool; and a memory block management table reproduction portion reproducing the memory block management table for the object management table from the low-order and high-order memory block addresses calculated by the memory block address calculator and also from the memory pool address restored by the memory pool address returned portion.

9 Claims, 13 Drawing Sheets

1

MEMORY MANAGEMENT SYSTEM AND METHOD

BACKGROUND OF THE INVENTION

The present invention relates to a memory management system in an operating system and, more particularly, to a system and a method of memory management in an operating system using variable length memory block management.

Heretofore, in an operating system (hereinafter abbreviated as OS) which adopts variable length memory block management, a memory block which is cut out (or acquired) from a memory pool is always appended with a management table (also called memory block management table) for its managing.

The memory block management table is a data structure for all the memory block purposes. However, where the memory block is used as an object management table for the management of objects such as tasks, semaphores, etc. in the OS, almost all the areas of the memory block management table that is always appended to the object management table is not utilized in the object operation. That is, where the memory block is used as the object management table, information in the memory block management table is required only when the memory block is returned to the memory pool.

A process in the prior art memory management system for producing or returning an object management table by the memory block in order to produce or delete an object will now be described.

FIG. 2 shows an example of the memory block management table configuration, and FIG. 3 shows an example of the prior art object management table configuration.

FIG. 4 is a flow chart illustrating an object management table production routine in a prior art memory management system, and FIG. 5 is a flow chart illustrating an object management table deletion routine in the prior art memory management system.

Now, an acquisition process of a memory block for an object management table when an object production request is made to the OS will be described with reference to FIG. 4. When the object production request is made to the OS, a step S1 in FIG. 4 is executed, in which a memory block having a size of (an area necessary for an object management table)+(an area necessary for a memory block management table) is cut out from a memory pool. In a subsequent step S2, a memory block management table having the configuration shown in FIG. 2 is produced in the cut-out memory area. The memory block management table is to be used by the OS for memory block management, and it is always appended to a memory block for any purpose when the memory block is cut out.

In a subsequent step S3, a management table for the intended object is produced in the cut-out memory block, thus bringing an end to the object production process.

FIG. 3 shows the configuration of the object management table produced in the above steps S1 through S3. As shown, the object management table is appended with the memory block management table for memory block management.

Now, a routine for returning the memory block that has been used as the object management table to the system memory pool by deleting the object will be described with reference to FIG. 5. In a step S4 shown in FIG. 5, an attribute memory pool access address 15 (see FIG. 2) that belongs to the memory block management table appended to the object

2 management table, with respect to which a deletion request has been made, is obtained. In a subsequent step S5, the pertinent memory block is returned to the memory pool, to which the memory block had been attributed.

The OS executes a process operation with respect to an object with reference to only the information for the object management block. Further, in the memory block acquiring and returning processes with respect to an object, as the memory block management table information, high-order and low-order addresses 13 and 14 of memory block and address 15 of attribute memory pool are required when returning the memory block, and other information are required only within the system or only when using a memory block as a mail box message. In other words, where a memory block is used as an object management table, the memory block management table is operated when and only when returning the memory block. Consequently, the memory utility efficiency is low.

As shown above, in the prior art memory management system the memory block management table which is always appended to the memory block when acquiring the memory block, is used in practice only when returning the acquired memory block and not used in the actual object operation. Thus, the memory block management table occupies useless memory area, which is undesired for efficient memory utility.

To delete the useless memory area, for instance, the memory block for the object management table may be managed in a separate process. Doing so, however, leads to the OS module size increase, and is particularly impractical in an assembly system, for which size reduction and operation speed increase are required.

SUMMARY OF THE INVENTION

An object of the present invention is, therefore, to provide a memory management system and a memory management method, which can solve the above problem and greatly increase the utility efficiency of the memory area by the memory block management table, which is always appended to the memory block when acquiring a memory block for the object management table.

According to one aspect of the present invention there is provided a memory management system for managing a memory block in an operating system, which adopts variable length memory block management, and in which a memory area of a memory block management table that is appended when acquiring the memory block is used as an object management table, the memory block management system comprising at least: memory pool access address preservation means; memory block address calculation means; memory pool address return means; and memory block management table reproduction means; the memory block address calculation means including means for calculating a low-order address of the memory block and means for calculating a high-order address of the memory block; the memory pool address preservation means preserves a memory pool address stored in the memory block management table in a memory pool address storage area when acquiring the memory block for the object management table from a memory pool; the memory pool address return means reading out a memory pool address held in the memory pool address preservation means when returning the memory block or the object management table to the memory pool; the memory block management table reproduction means reproducing the memory block management table for the object management table from the low-order and high-order memory block addresses calculated by the memory block address calculation means and also from the memory pool address returned by the memory pool address returned means.

According to another aspect of the present invention there is provided a memory management method for managing a memory block in an operating system adopting variable length memory block management, comprising: a step of acquiring a memory block used as an object management table from a memory pool by: cutting a memory block corresponding to the size of the object management table out the memory pool; assigning the cut-out memory block to a memory block management table for managing the memory block of the object management table from the leading address of the cut-out memory block; preserving a memory pool address stored in the memory block management table in a predetermined preservation area; and using a memory area of the memory block management table as the object management table; and a step of returning the memory block having been used as the object management table to the memory pool by: calculating a low-order address of the memory block to be returned from the leading address of the cut-out memory block and the size of the memory block management table and also calculating a high-order address of the memory block to be returned from the leading address of the memory block and the size of the object management table area; returning the preserved memory pool address; and re-constructing the memory block management table for managing the memory block to be returned.

Other objects and features will be clarified from the following description with reference to attached drawings.

DETAILED DESCRIPTION OF THE PREFERRED EMBODIMENTS

Now, a first embodiment of the memory management system according to the present invention will be described in connection with routines of producing and deleting a semaphore as an object will be described.

Figure 1:
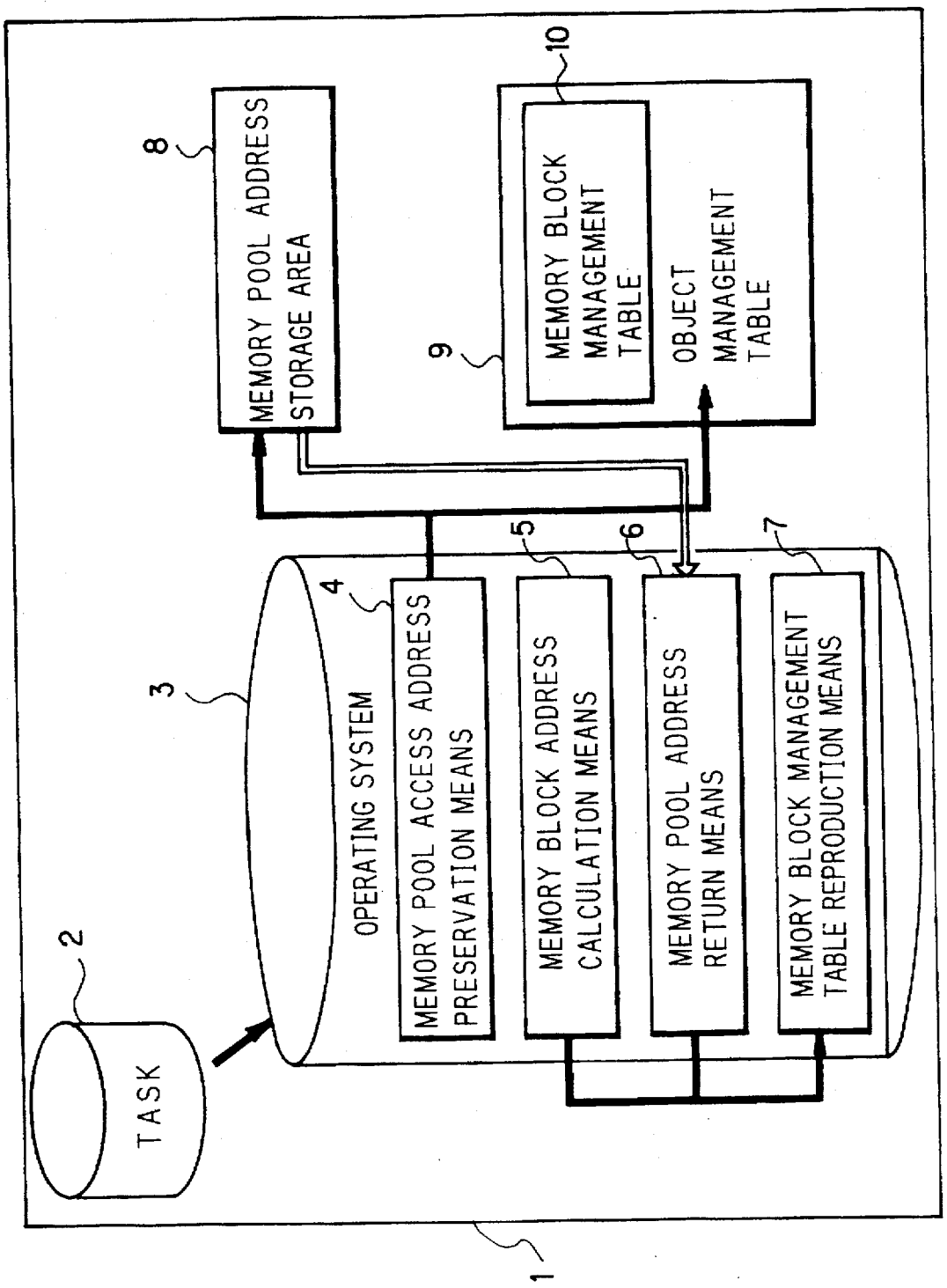
FIG. 1 is a block diagram illustrating the acquiring and returning of a memory block for an object management table according to the present invention.
Figure 6:
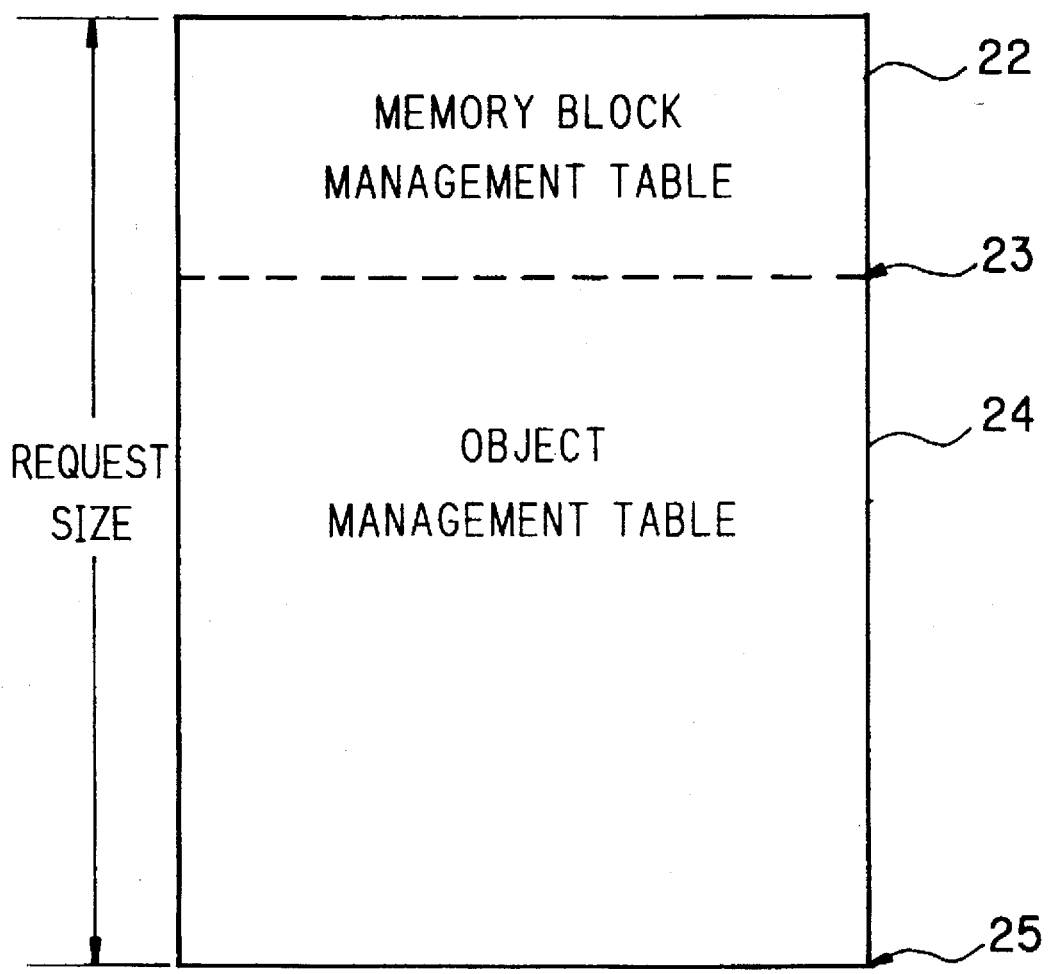
FIG. 6 shows a configuration of a memory block in the embodiment of the invention.
Figure 7:
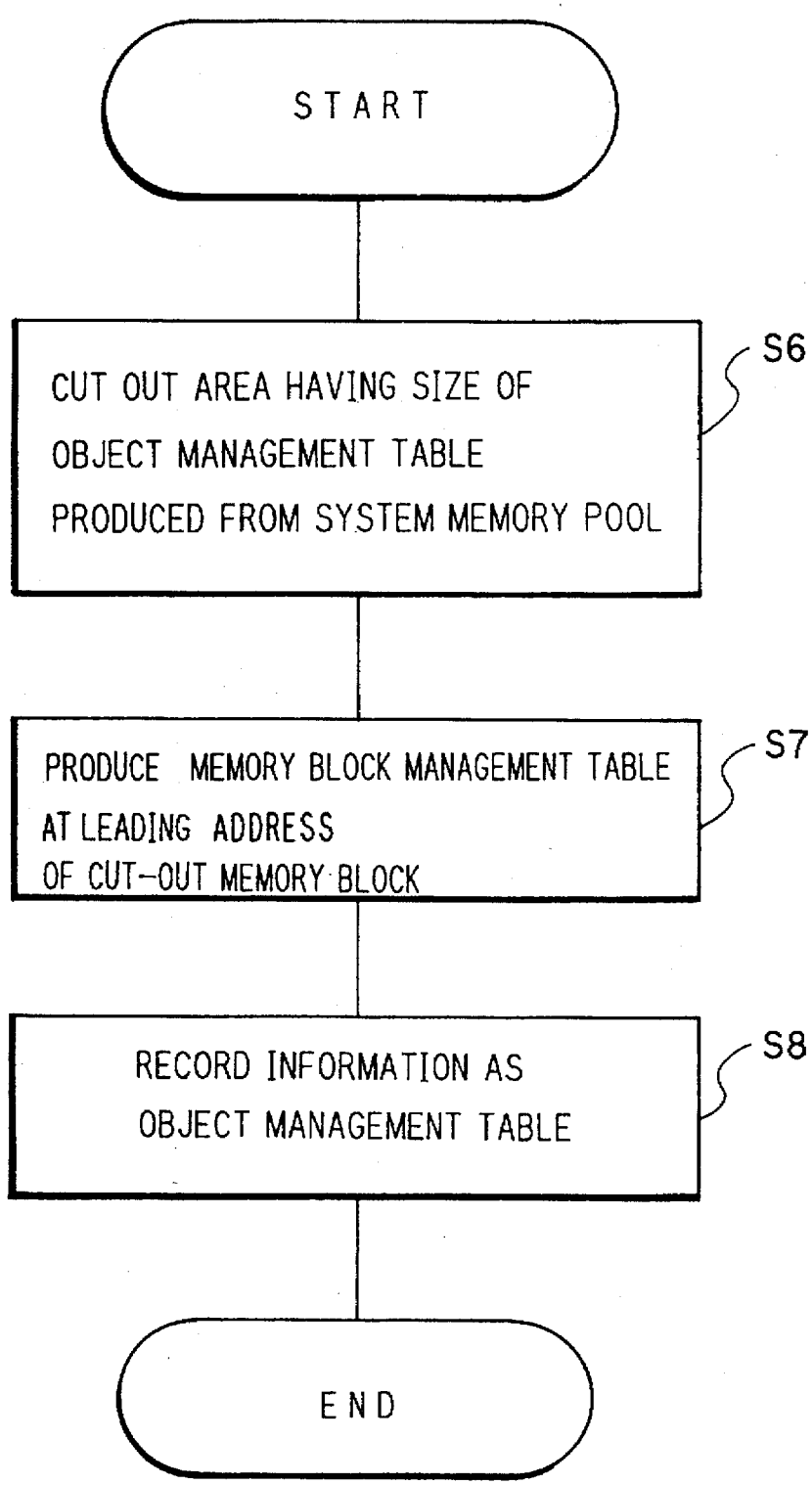
FIG. 7 is a flow chart showing a routine of acquiring an object management table in a first embodiment of the present invention.
Figure 8:
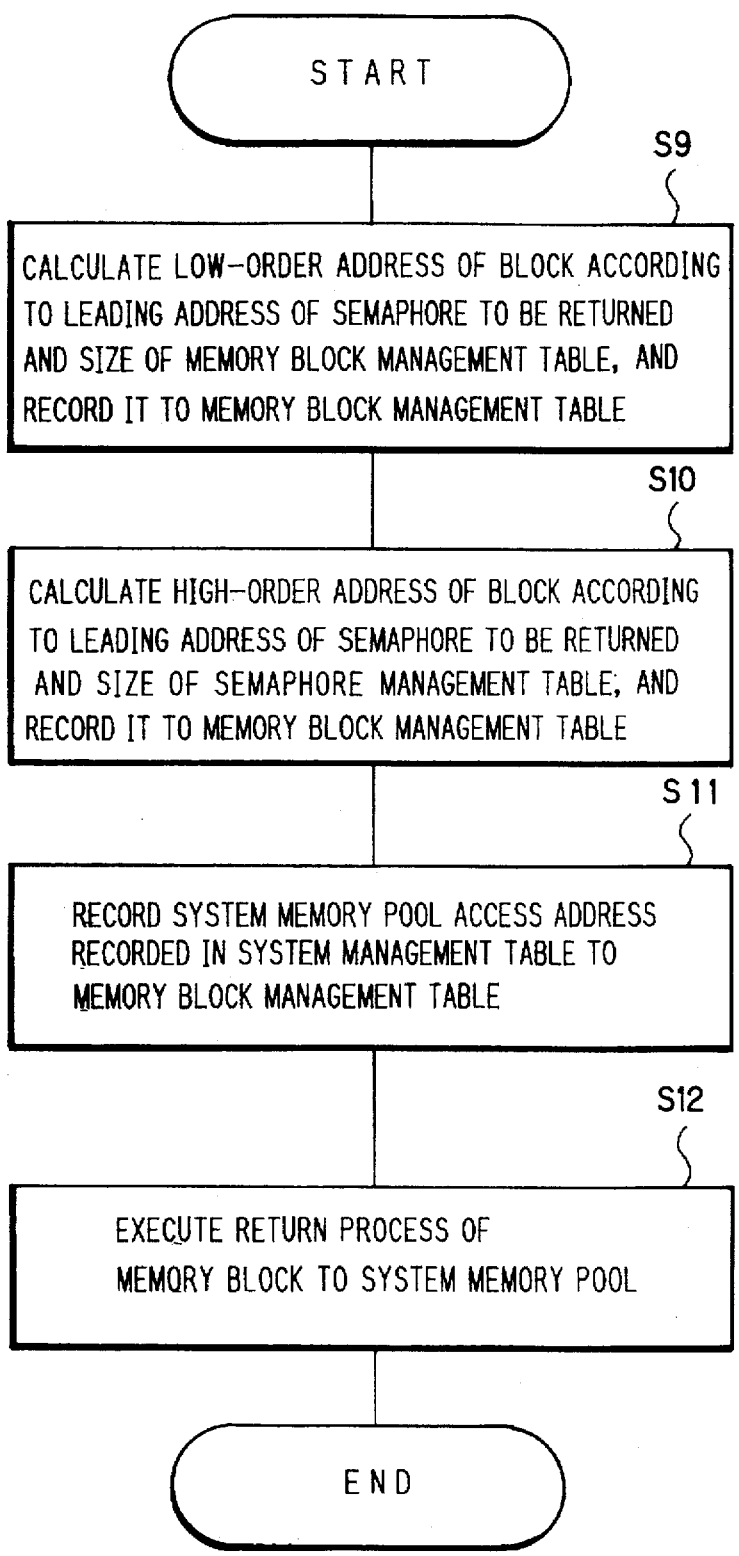
FIG. 8 is a flow chart showing a routine of returning the object management table in the first embodiment of the present invention.
Figure 9:
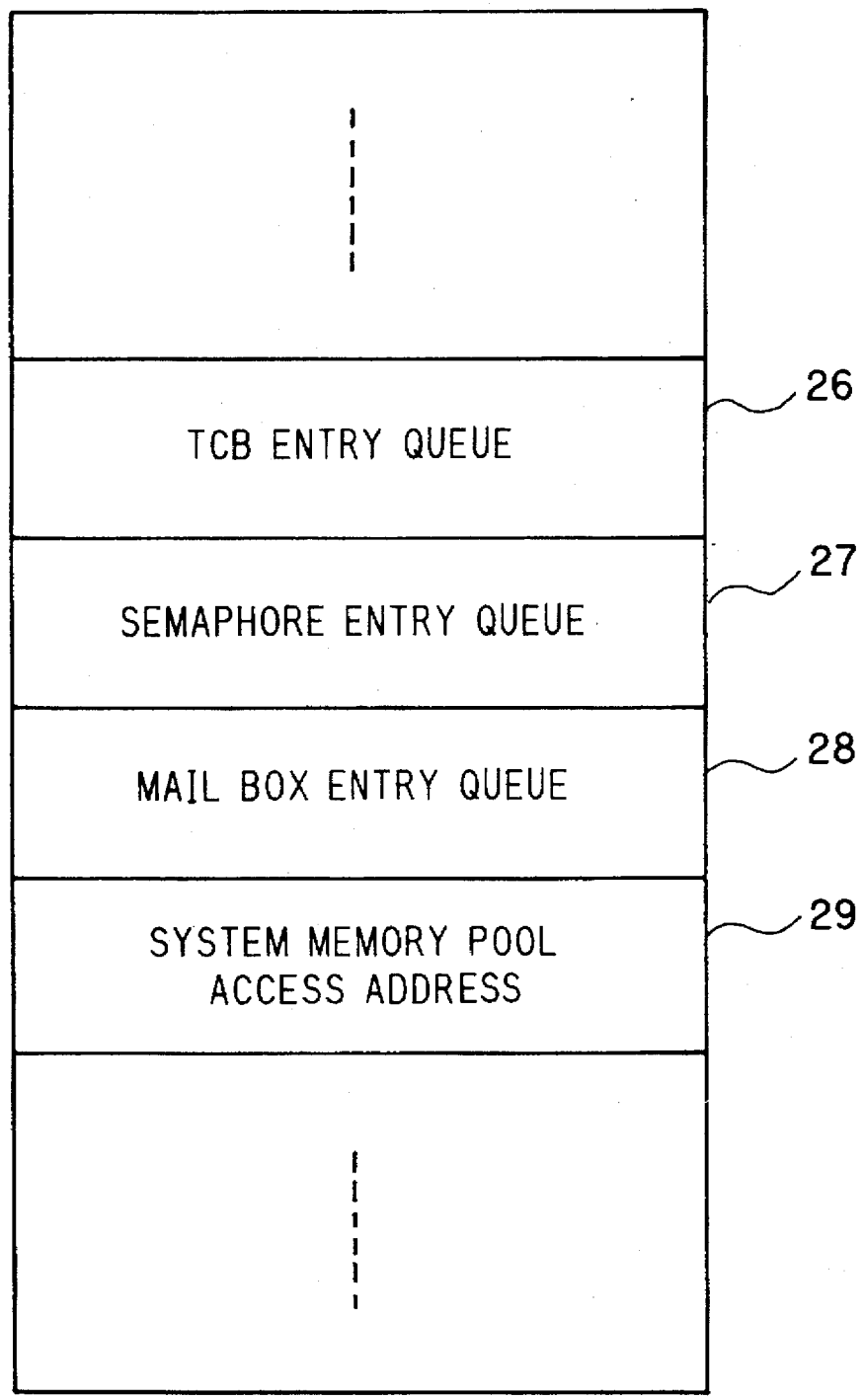
FIG. 9 shows the configuration of a system management table in the first embodiment of the present invention.
Figure 10:
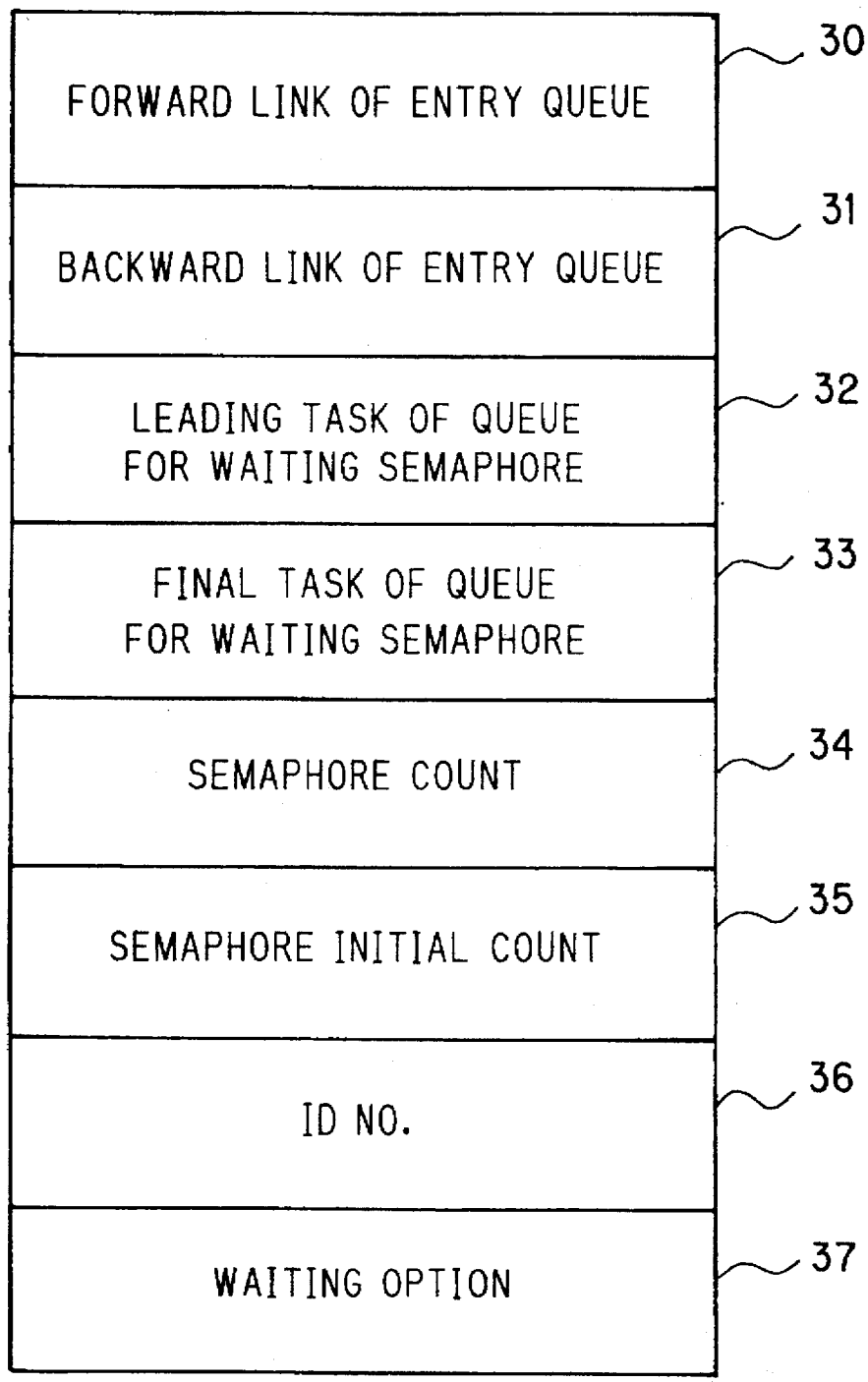
FIG. 10 shows the configuration of a semaphore management table in the first embodiment of the present invention.

FIG. 1 is a block diagram illustrating the acquiring and returning of a memory block for an object management table according to the present invention. FIG. 6 shows the configuration of a memory block in the embodiment of the present invention. FIG. 7 is a flow chart showing a routine of acquiring an object management table in a first embodiment of the present invention. FIG. 8 is a flow chart showing a routine of returning the object management table in the first embodiment of the present invention. FIG. 9 shows the configuration of a system management table in the first embodiment of the present invention. FIG. 10 shows the configuration of a semaphore management table in the first embodiment of the present invention.

Referring to FIG. 1, this embodiment of the memory block management system is provided in an OS (operating system) 3 present in a main memory 1, and it comprises a memory pool access address preservation means 4, a memory block address calculation means 5, a memory pool address return means 6 and a memory block management table reproduction means 7.

When a task 2 provides a request for producing an object (i.e., a semaphore in this embodiment), the memory pool access address preservation means 4 preserves a memory pool address in a memory pool address storage area 8 to cut out a memory block of an object management table 9.

The memory block address calculation means 5 calculates a high-order/low-order address of a memory block area from the leading address of the object management table and the sizes of the memory block management table and object management table.

The memory pool address return means 6 records the memory pool address that has been preserved in the memory pool address storage area 8 to a predetermined area thereof corresponding to a memory block management table 10 in the cut-out object management table 9.

The memory block management table reproduction means 7 reproduces a memory block management table for the object management table on the basis of the high-order/low-order addresses of the memory block area as calculated by the memory block address calculation means 5 and the information returned by the memory pool address return means 6.

In this embodiment, only a single memory pool for acquiring the memory block for the object management table is provided in the system. At the time of the activation of the system, the memory pool address is recorded in the memory pool address 29 in the system management table with the configuration as shown in FIG. 9. The memory pool for producing the object management block is referred to as "system memory pool".

Now, the routine of acquiring the memory block when producing a semaphore in this embodiment will be described with reference to FIG. 7. When a semaphore production request is made to the OS, a memory block for producing a semaphore management table (see FIG. 10) is cut out from the system memory pool area in a step S6. The request size at this time is the table size of the semaphore management table without including the area size of the memory block management table for the semaphore management table.

Figure 2:
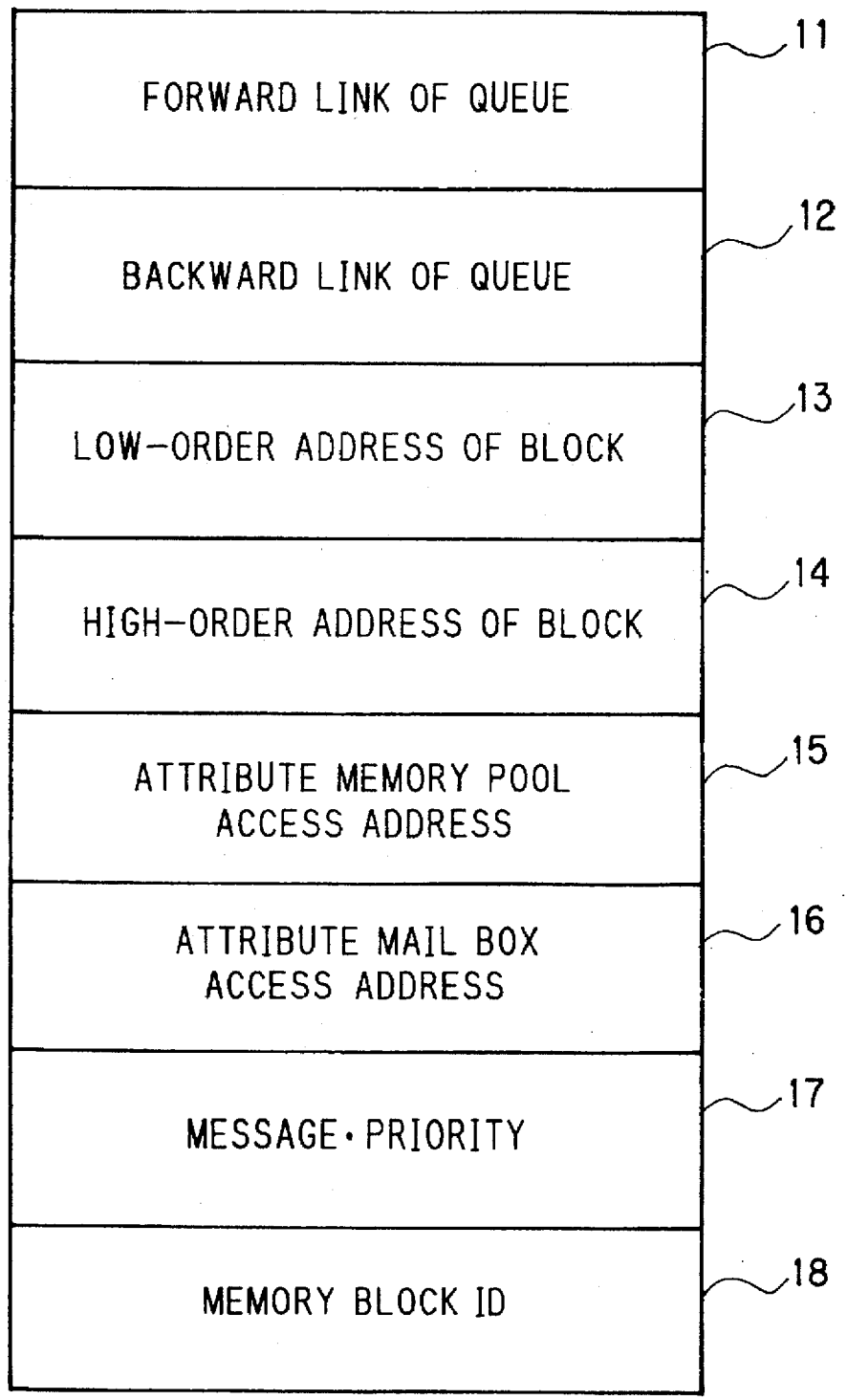
FIG. 2 shows an example of the memory block management table configuration.
Figure 3:
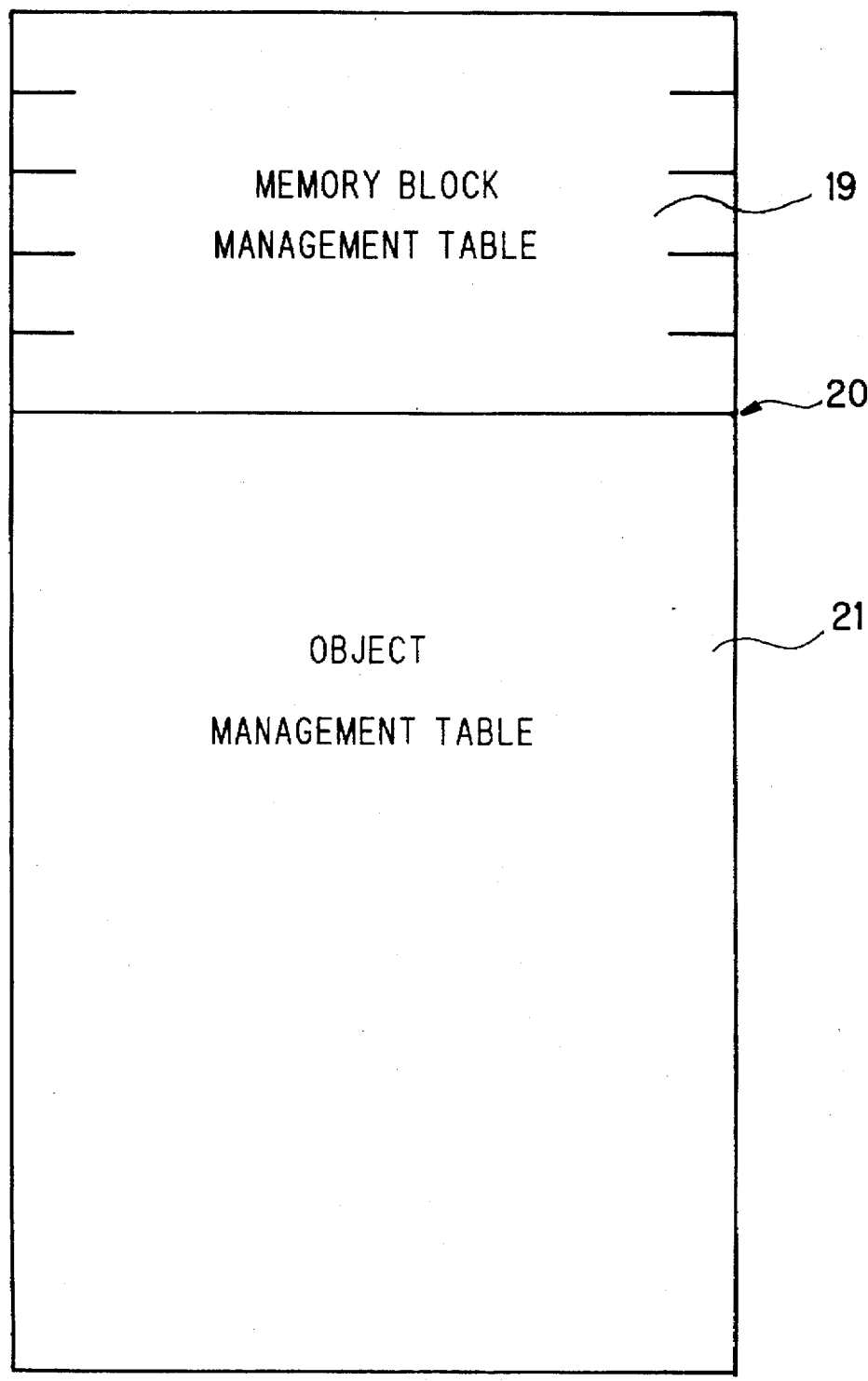
FIG. 3 shows an example of the prior art object management table configuration.
Figure 4:
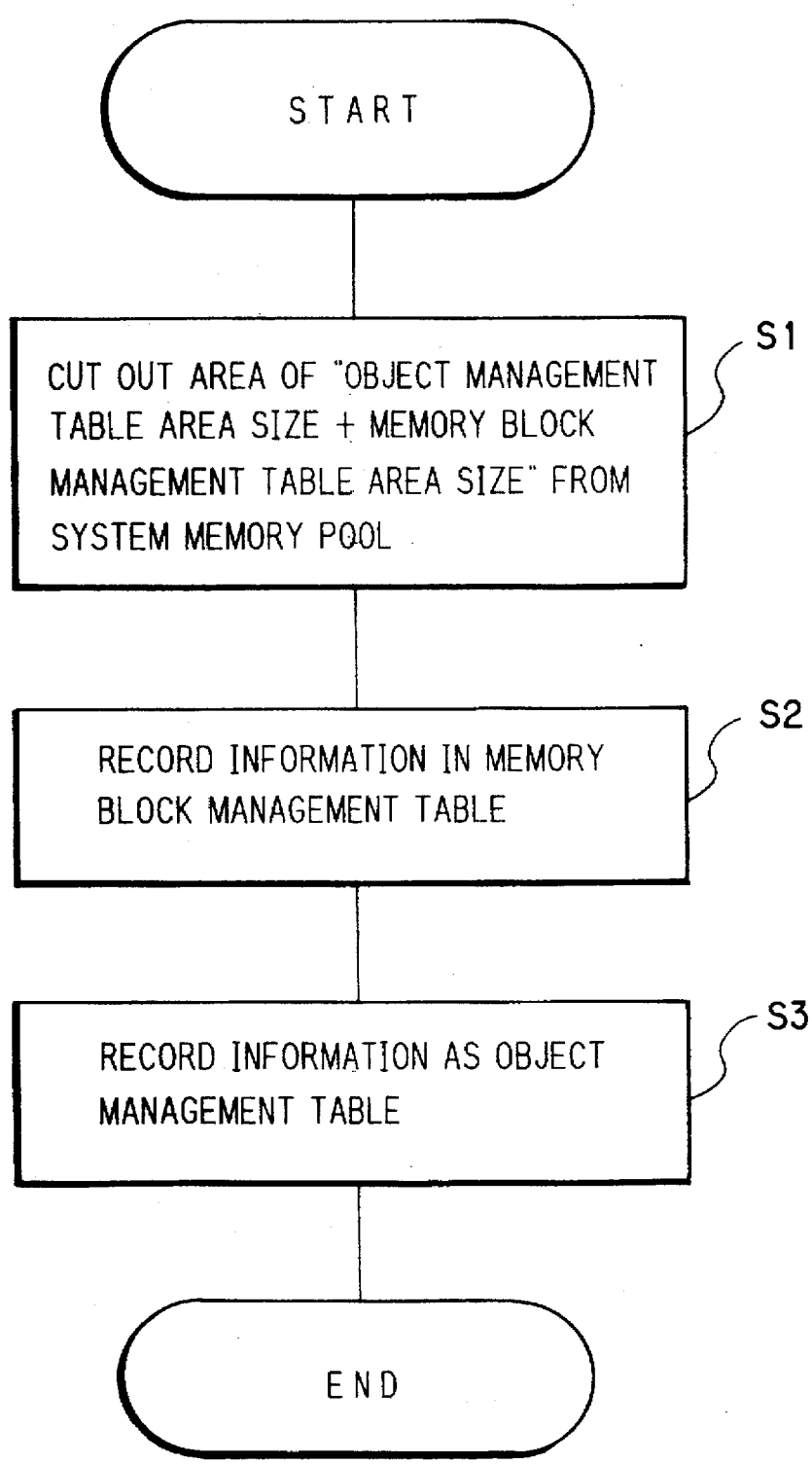
FIG. 4 is a flow chart illustrating an object management table production routine in a prior art memory management system.
Figure 5:
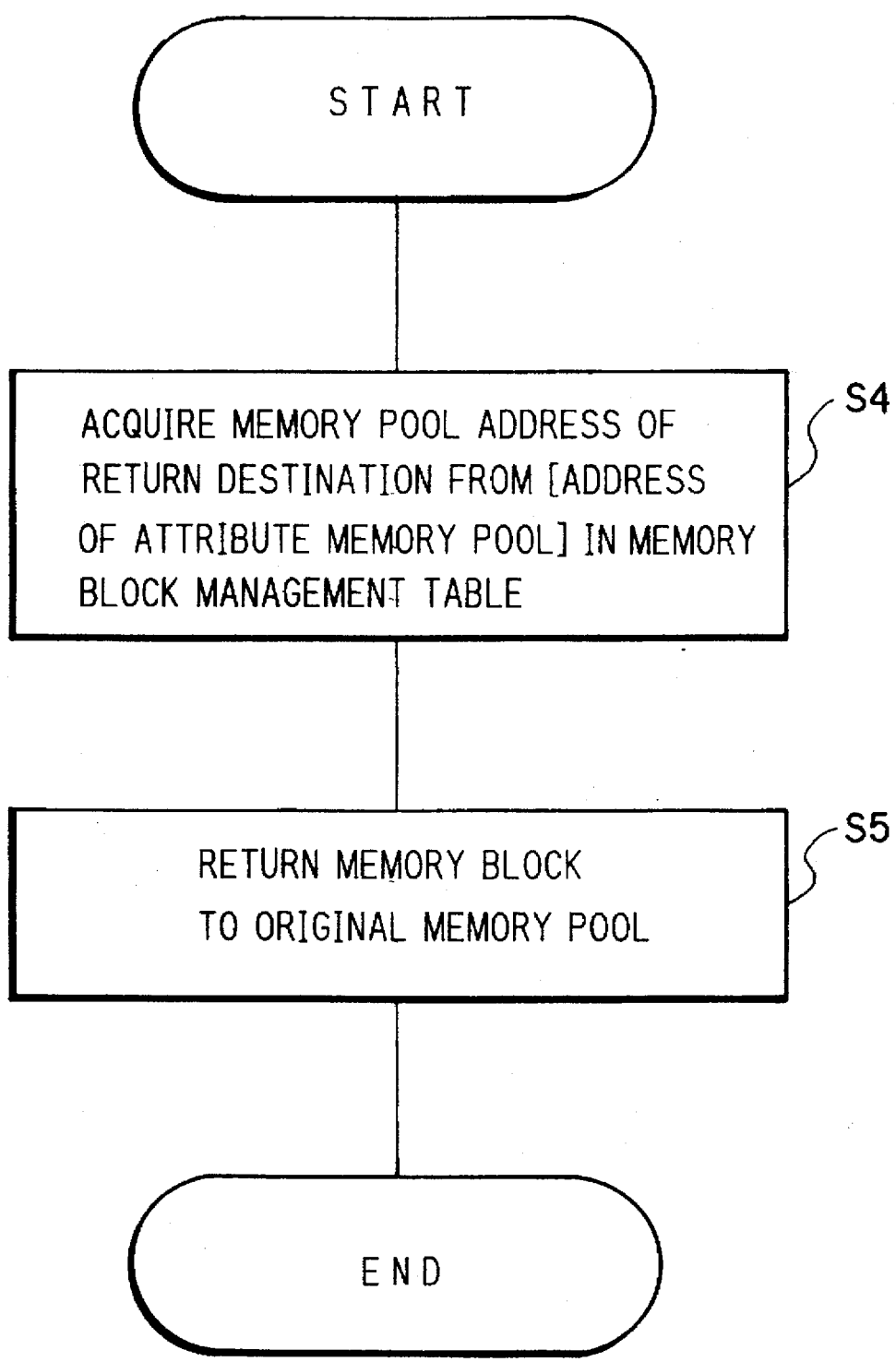
FIG. 5 is a flow chart illustrating an object management table deletion routine in the prior art memory management system.

In a subsequent step S7, the memory block management table as shown in FIG. 2 is produced in the leading of the cut-out memory block area. Then, in a step S8, the information as the semaphore management table is recorded from the leading of the memory block that has been cut out from the system memory pool in the process of the step S6. In greater detail, in this step the information as the semaphore management table is recorded from the leading of the memory block by overriding in the memory block management table area. Thus, the original memory block management table information is destroyed, and the sole information as the semaphore management table is made to be present in the cut-out memory block.

As shown, in the routine of acquiring the semaphore management table in this embodiment, the memory block management table for the semaphore management table which is not practically required in the semaphore operation is not present in the main memory 1. It is thus possible to obtain increased memory utility efficiency.

Now, the routine of returning the memory block for the semaphore management table when the semaphore is deleted will be described with reference to FIG. 8.

In steps S9 to S11 in FIG. 8, of the contents in the memory block management table (see FIG. 2) that is destroyed when producing the semaphore management table, only three pieces of information, i.e., the low-order and high-order addresses 13 and 14 of memory block and the attribute memory pool access address 15, these pieces of information being required for the returning of the memory block, are recorded in the memory block to reproduce the memory block management table.

In the first place, in the step S9 the low-order address of the memory block (shown at 23 in FIG. 6) is calculated and stored in the memory block management table.

The low-order address of the memory block area is calculated as follows:

(Low-order address of memory block )=(Leading address of semaphore management table)+(Size of memory block management table)

The size of the memory block management table is constant in the system and has a known value.

Semaphore management tables or like object management tables are entered in respective object entry queue in the system management table, and the leading address of the desired semaphore management table can be found by retrieving the entry queue.

In the subsequent step S10, the high-order address of the memory block (designated at 25 in FIG. 6) is calculated and recorded in the memory block management table.

The high-order address of the memory block is calculated as follows:

(High-order address of memory block)=(Leading address of semaphore management table)+(Size of semaphore management table)

The size of the semaphore management table is constant in the system and has a known value.

Then, in the step S11 the system memory pool access address 29 recorded in the system management table (see FIG. 9) is recorded in the attribute memory pool access address 15 (see FIG. 2) in the semaphore management table in an area thereof corresponding to the original memory block management table.

The routine then goes to a step S12 of returning the memory block to the system memory pool according to the memory block management table that has been reproduced in the steps S9 to S11.

As has been shown, in this embodiment it is possible to reproduce the memory block management table by holding the address of the memory pool, from which a memory block is cut out for producing a semaphore management table, in the system management table and without holding the memory block management table area for the semaphore management table that is not practically required for the semaphore operation itself.

Since in this embodiment the memory block management table is appended when acquiring and returning the memory block, it is possible to utilize a prior art processing module for the memory block operation without any modification.

Now, a second embodiment of the memory management system according to the present invention will be described in connection with the routines of producing and deleting a semaphore as an object in a system, in which are a plurality of memory pools.

As noted above, a system memory pool is present for managing all the OS memories in the system, and the acquiring of a memory block or the like is done from the memory pool. Further, it is possible that the user produces a memory pool separately from that for the system. Further, it is possible to acquire a memory block from a memory pool which is produced separately from the system. To this end, the memory block management table (see FIG. 2) has an area 15 for storing the address of the memory pool, to which a memory block attributes.

Figure 11:
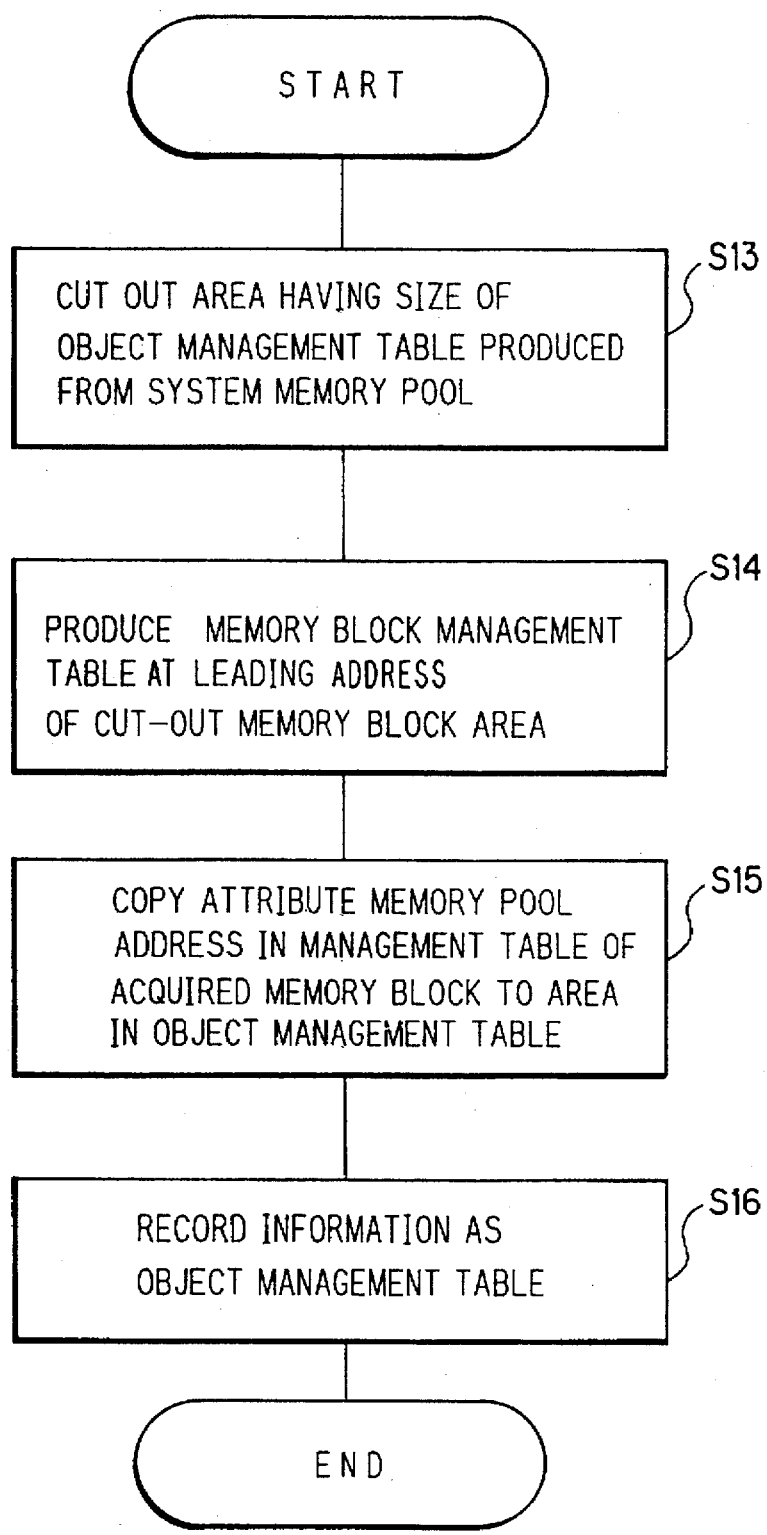
FIG. 11 is a flow chart illustrating the routine of acquiring an object management table in the second embodiment of the present invention.
Figure 12:
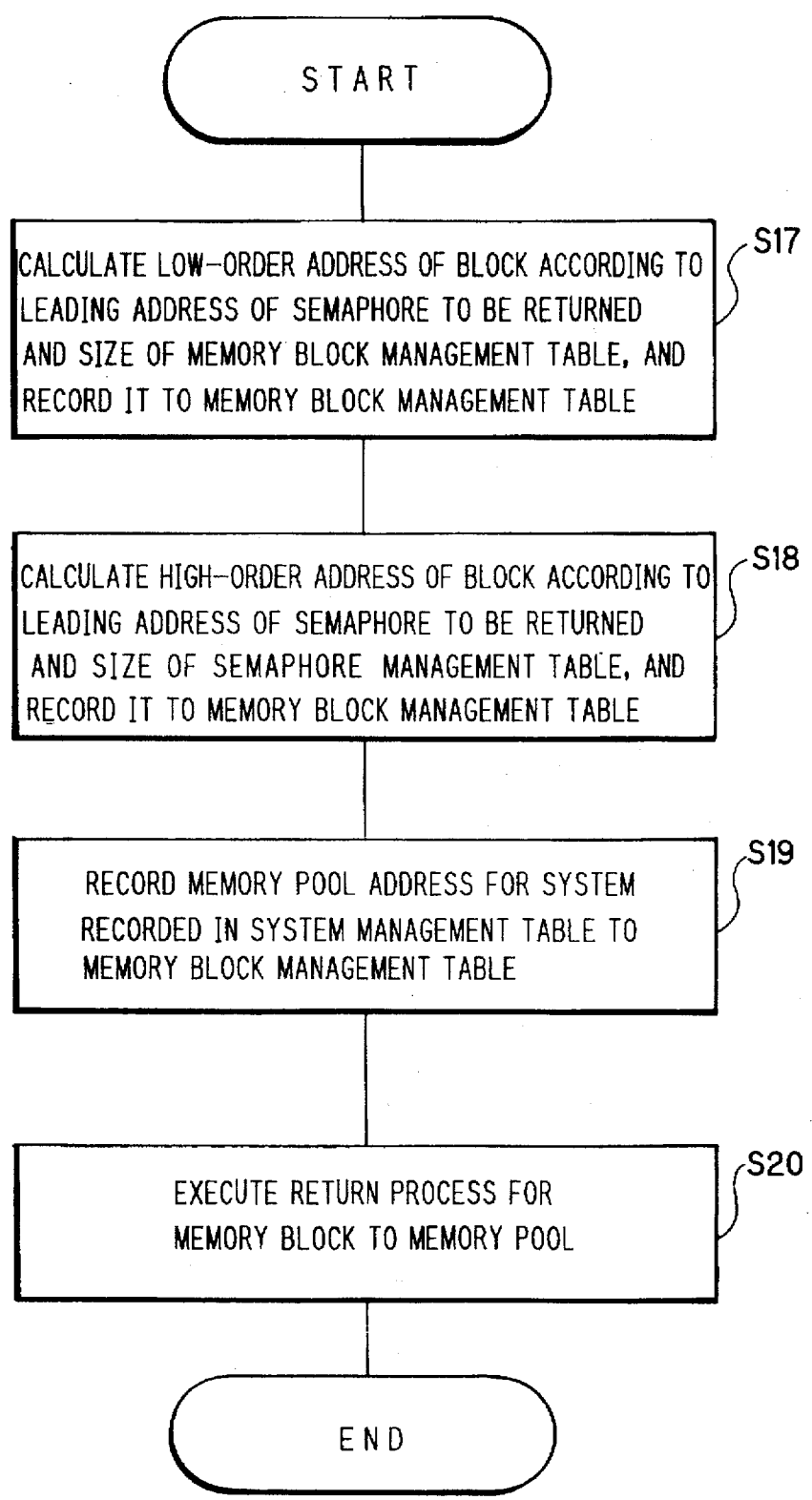
FIG. 12 is a flow chart of the routine of returning the object management table in the second embodiment of the present invention.
Figure 13:
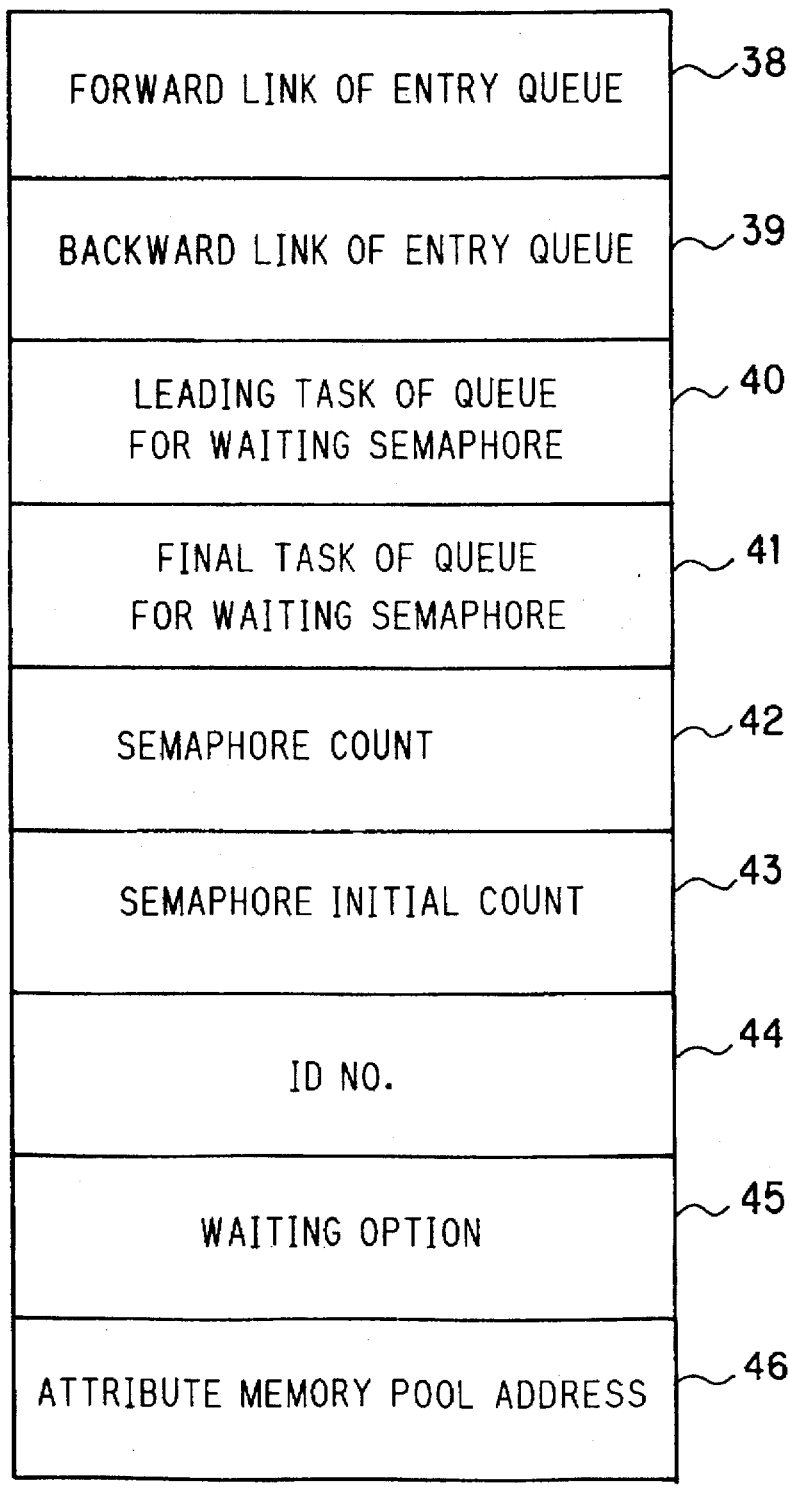
FIG. 13 shows the configuration of a semaphore management table in the second embodiment of the present invention.

FIG. 11 is a flow chart illustrating the routine of acquiring an object management table in the second embodiment of the present invention. FIG. 12 is a flow chart of the routine of returning the object management table in the second embodiment of the present invention. FIG. 13 shows the configuration of a semaphore management table in the second embodiment of the present invention.

In the second embodiment of the present invention, the memory block management system, like the first embodiment, has a construction as shown in FIG. 1. As shown, the OS (operating system) 3 present on a main memory 1 comprises a memory pool access address preservation means 4, a memory block address calculation means 5, a memory pool address return means 6, and a memory block management table reproduction means 7.

As shown in FIG. 13, in the second embodiment of the present invention, the attribute memory pool address 46 of a semaphore management table is provided as a storage area, in which the memory pool access address preservation means 4 preserves the memory pool address.

Now, the routine of acquiring a memory block when producing a semaphore in the second embodiment of the present invention, will be described with reference to FIG. 11. When a semaphore production request is made to the OS, a memory block for the semaphore management table is cut out from the system memory pool in a step S13. The request size at this time is the table size of the semaphore management table without including the size of the memory block management table area for the semaphore management table.

In a subsequent step S14, the memory block management table (see FIG. 2) is produced in the leading of the cut-out memory block area. FIG. 6 shows the status of the memory block at the instant of end of the step S14.

Then, in a step S15 the information of the attribute memory pool address 15 in the memory block management table produced in the process of the step S14 is preserved in the attribute memory pool address 46 (see FIG. 13) provided in the semaphore management table.

Then, in a step S16 the information as the semaphore management table is recorded in the memory block cut out in the step S13 from the leading address of the memory block. In this step, the information as the semaphore management table is recorded by overriding in the memory block from the leading address thereof, the original memory block management table is destroyed, and only the information as the semaphore management table is present in the cut-out memory block.

In the above routine of acquiring the semaphore management block, the memory block management table for the semaphore management table which is not practically required for the semaphore operation is not present on the main memory 1. It is thus possible to obtain increased memory utility efficiency.

Now, the routine of returning the memory block for the semaphore management table when the semaphore is deleted will be described with reference to FIG. 12.

In steps S17 to S19 in FIG. 12, of the memory block management table shown in FIG. 2, which was destroyed when the semaphore management table was produced, only three pieces of information, i.e., the low-order and high-order addresses 13 and 14 of the memory block and the attribute memory pool address 15 assigning the destination, to which the memory block is to be returned, only these pieces of information being required for the returning of the memory block, is recorded in the memory block, thus reproducing the memory block management table.

In the first place, in the step S17 the low-order address of the memory block (designated at 23 in FIG. 6) is calculated and stored in the low-order address 13 of the memory block in the memory block management table shown in FIG. 2.

The low-order address memory block is calculated as follows:

(Lower-order address of memory block)=(Leading address of semaphore management table)+(Size of memory block management table)

The size of the memory block management table is constant in the system and has a known value.

In a subsequent step S18, the high-order of the memory block (designated at 25 in FIG. 6) is calculated and stored in the high-order address 14 of the memory block in the memory block management table shown in FIG. 2.

The memory block high-order address is calculated as follows:

(High-order address of memory block)=(Leading address of semaphore management table)+(Size of semaphore management table)

The semaphore management table size is constant in the system and has a known value.

Then, in the step S19 the memory pool address which has been previously preserved in the attribute memory pool address 46 of the semaphore management table (see FIG. 13) in the process of the step S15, is written and returned in the attribute memory pool address 15 (see FIG. 2) in the area of the semaphore management table corresponding to the original memory block management table.

Then, the routine goes to a step S20 of returning the memory block to the memory pool according to the memory block management table reproduced in the steps S17 to S19.

As has been shown, in this embodiment it is possible to reproduce the memory block management table by holding the memory pool address for the production of the semaphore management table in the semaphore management table area and without holding the memory block management table area for the semaphore management table which is not practically required for the semaphore operation.

Further, since the memory block management table is appended when acquiring and returning the memory block, it is possible to utilize a prior art processing module for the processing of the memory block operation without any modification.

As has been described in the foregoing, in the memory management system according to the present invention the memory block management table area that is produced for the memory block cut out for the object management table is used as the object management table without holding it. It is thus possible to obtain increased memory utility efficiency. Particularly, it is possible to attain a great reduction of the memory area in a real-time OS or the like, for which size reduction and operating speed increase are required.

Further, since according to the present invention the memory block management table is present when acquiring and returning the memory block, a prior art processing module may be used for the processing of the memory block operation without any modification. Thus, it is possible to eliminate the necessity of introducing a new processing system for the object management table and permits common memory management processing. Moreover, it is possible to reduce the size of the processing module.

What is claimed is:

1. A memory management system for managing a memory block in an operating system, which adopts variable length memory block management, and in which a memory area of a memory block management table that is appended when acquiring the memory block is used as an object management table, the memory block management system comprising at least:

memory pool access address preservation means;
memory block address calculation means;
memory pool address return means; and
memory block management table reproduction means;
said memory block address calculation means including means for calculating a low-order address of the memory block and means for calculating a high-order address of the memory block;
said memory pool address preservation means preserving a memory pool address stored in the memory block management table in a memory pool address storage area when acquiring the memory block for the object management table from a memory pool;
the memory pool address return means reading out a memory pool address held in the memory pool address preservation means when returning the memory block or the object management table to the memory pool;
the memory block management table reproduction means reproducing the memory block management table for the object management table from the low-order and high-order memory block addresses calculated by the memory block address calculation means and also from the memory pool address return by the memory pool address return means.

2. The memory management system according to claim 1, wherein a memory pool address storage area is provided in a system management table.

3. The memory management system according to claim 1, wherein a memory pool address storage area is provided in the object management table, said memory pool address preservation means preserves a memory pool address in the memory pool address storage area of the object management table when the memory block for the object management table is acquired from the memory pool.

4. A memory management method for managing a memory block in an operating system adopting variable length memory block management, comprising:

a step of acquiring a memory block used as an object management table from a memory pool by:

cutting a memory block corresponding to the size of the object management table out the memory pool;

assigning the cut-out memory block to a memory block management table for managing the memory block of the object management table from a leading address of the cut-out memory block;

preserving a memory pool address stored in the memory block management table in a predetermined preservation area;

using a memory area of the memory block management table as the object management table; and a step of returning the memory block having been used as the object management table to the memory pool by:

calculating a low-order address of the memory block to be returned from the leading address of the cut-out memory block and the size of the memory block management table and also calculating a high-order address of the memory block to be returned from the leading address of the memory block and the size of the object management table area;

returning the preserved memory pool address; and re-constructing the memory block management table for managing the memory block to be returned.

5. The memory management method according to claim 4, wherein the memory pool address is preserved in a system management table.

6. The memory management method according to claim 4, wherein the address of an attribute memory pool in a system having a plurality of memory pools is preserved in the acquired object management table.

7. A memory block management system having a task, an operating system, a memory pool access address preservation means, a memory block address calculation means, a memory pool address return means, a memory block management table reproduction means in a main memory, and an object management table, wherein in response to a request for producing an object from said task, said memory pool access address preservation means preserves a memory pool address in said memory pool address storage area to cut out a memory block of said object management table;

said memory block address calculation means calculates a high-order/low-order address of a memory block area from a leading address of the object management table and sizes of the memory block management table and object management table;

said memory pool address return means records a memory pool address that has been preserved in the memory pool address storage area to a predetermined area thereof corresponding to a memory block management table in the cut-out object management table; and said memory block management table reproduction means reproduces a memory block management table for the object management table on the basis of the high-order/low-order addresses of the memory block area obtained by the memory block address calculation means and the information returned by the memory pool address return means.

8. A method of returning a memory block for a semaphore management table when a semaphore is deleted comprising:

a first step for calculating a low-order address of a memory block and storing it in a memory block management table, said low-order address of the memory block area being calculated by adding a first address of the semaphore management table and a size of the memory block management table;

a second step for calculating a high-order address of a memory block and recording it in a memory block management table, said high-order address of the memory block being calculated by adding a leading address of the semaphore management table and a size of the semaphore management table;

a third step for recording a system memory pool access address recorded in a system management table in an attribute memory pool access address in the semaphore management table in an area thereof corresponding to the original memory block management table; and a fourth step for returning the memory block to the system memory pool according to the memory block management table.

9. A method of returning a memory block for a semaphore management table when a semaphore is deleted comprising:

a first step for calculating a low-order address of the memory block and storing it in a low-order address of the memory block in a memory block management table, said low-order address memory block being calculated by adding a leading address of the semaphore management table and size of the memory block management table;

a second step for calculating a high-order address of the memory block and storing it in a high-order address of the memory block in the memory block management table, the high-order address of said memory block being calculated by adding a leading address of the semaphore management table and a size of the semaphore management table;

a third step for writing and returning the memory pool address, which has been previously preserved in an attribute memory pool address of the semaphore management table, in an attribute memory pool address in an area of the semaphore management table corresponding to the original memory block management table; and a fourth step for returning the memory block to the memory pool according to the memory block management table.

* * * * *